Figure 1:
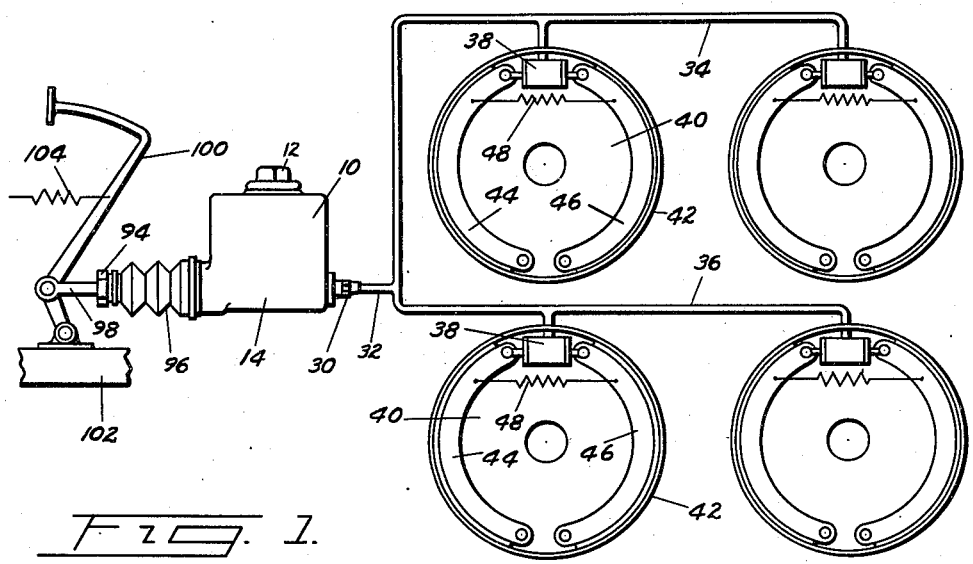

April 26, 1938.  H. C. BOWEN  2,114,991

PRESSURE PRODUCING DEVICE FOR FLUID PRESSURE SYSTEMS

Filed Nov. 30, 1935

INVENTOR.
HERBERT C. BOWEN
BY
Williams, Bradbury, McCaleb & Hinkle
ATTORNEYS.

Patented Apr. 26, 1938

2,114,991

UNITED STATES PATENT OFFICE 2,114,991

PRESSURE PRODUCING DEVICE FOR FLUID PRESSURE SYSTEMS

Herbert C. Bowen, Detroit, Mich., assignor to Hydraulic Brake Company, Detroit, Mich., a corporation of California Application November 30, 1935, Serial No. 52,397

4 Claims. (Cl. 60—54.6)

This invention relates to brakes, and more particularly to fluid pressure brakes for motor vehicles.

Broadly the invention comprehends a fluid brake system for motor vehicles including a manually operated fluid pressure producing means connected by fluid pressure delivery pipes or conduits to fluid pressure actuated motors for the actuation of brakes associated with the wheels of a vehicle, and means interposed between the fluid pressure producing means and the fluid pressure actuated motors operative to maintain a predetermined pressure on the motors.

An object of the invention is to provide a fluid pressure brake system having means for maintaining a predetermined pressure on a part of the system.

Another object of the invention is to provide a fluid pressure brake system including a fluid pressure producing device connected by fluid pressure delivery pipes to fluid pressure actuated motors, and means associated with the device for maintaining a predetermined pressure on the fluid pressure delivery pipes and motors.

Other objects and structural details of the invention will appear from the subjoined description taken in connection with the drawing forming a part of this specification, and in which,—

Figure 2:
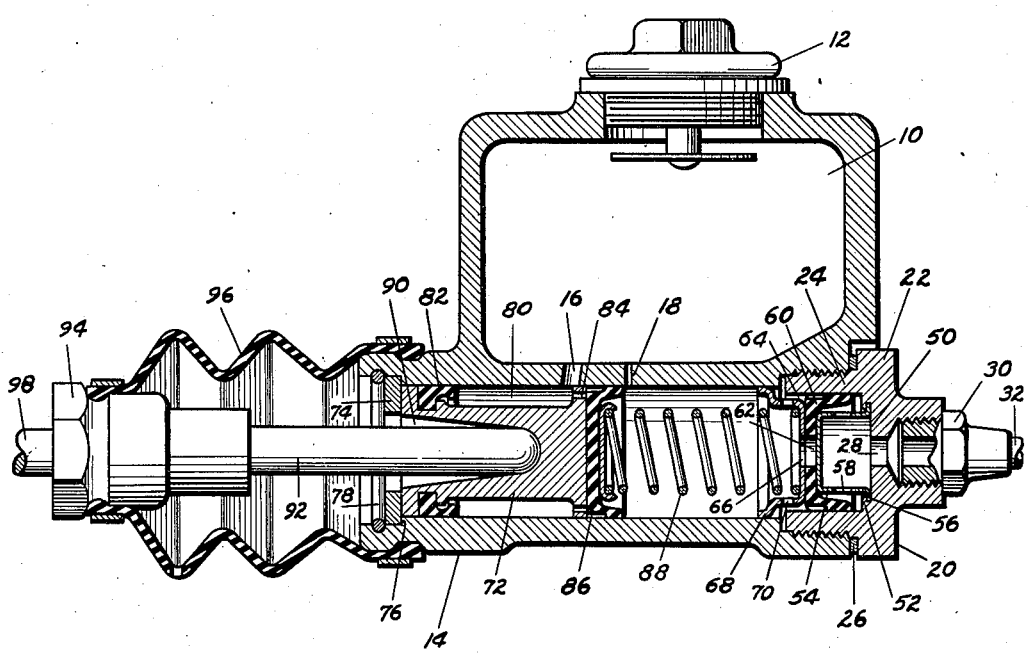

Fig. 1 is a schematic view of a hydraulic brake system embodying the invention, and Fig. 2 is a vertical sectional view of the fluid pressure producing device.

Referring to the drawing for more specific details of the invention, 10 represents a reservoir having a filling opening which may be closed by a plug 12 provided with suitable means, not shown, for venting the reservoir to the atmosphere; and a cylinder 14 formed at the bottom of the reservoir has spaced ports 16 and 18 providing communications between the cylinder and the reservoir.

The cylinder has a detachable head 20. As shown, the head has a rim 22, preferably provided with polygonal faces for the reception of a wrench, and a concentric sleeve 24 which may be threaded into the cylinder with a suitable gasket 26 interposed between the cylinder and the rim. The head is also provided with a discharge port 28 connected as by a suitable fitting 30 to a fluid pressure delivery pipe 32 having branches 34 and 36 each connected to one pair of fluid pressure actuated motors 38. One pair of the motors 38 is arranged for the actuation of the brakes associated with the front wheels of a vehicle and the other pair is arranged for the actuation of the brakes associated with the rear wheels of the vehicle.

Each brake includes a fixed support or backing plate 40 associated with a rotatable drum 42, and pivoted on the backing plate by their articulate ends are corresponding friction elements or shoes 44 and 46 for cooperation with the drum. A fluid pressure actuated motor corresponding to the motors 38 is mounted on the backing plate between the separable ends of the shoes and is operative to spread the shoes into engagement with the drum against the resistance of a retractile spring 48 connected between the shoes.

The discharge port 28 is controlled by a two-way valve. As shown, the inner face of the cylinder head is counter-bored as indicated at 50. This bore forms in conjunction with the sleeve 24 at the base thereof an annular shoulder 52. A thimble 54, open at one end and closed at the other end, has at its open end a circumferential flange 56 and a plurality of openings 58 in its wall. The flange 56 is fitted snugly in the counter-bore 50, and the shoulder is suitably deformed to secure the thimble against displacement. The closed end of the thimble provides a seat for an inverted collapsible sealing cup 60 having a coaxial opening 62, and bearing against the cup is a disk 64 having an axial opening 66 registering with the opening 62 in the cup and a flange 68 including two cylindrical sections of different diameters, that section having the smaller diameter fits the cylinder with a substantial clearance and is provided with a plurality of openings 70 so as to afford free passage of fluid, and that section having the larger diameter is fitted snugly in the cylinder so as to guide the disk during its movement.

A piston reciprocable in the cylinder 12 is retained against displacement by a washer 74 seated on an annular shoulder 76 in the open end of the cylinder and is secured in place by a split ring 78 seated in a circumferential groove in the wall of the cylinder. The piston has a reduced portion providing in conjunction with the wall of the cylinder an annular chamber 80 communicating with the reservoir 10 as by way of the ports 16. The skirt of the piston carries a leak-proof cup 82 providing against seepage of fluid from the cylinder past the piston, and the head of the piston has a plurality of ports 84 providing communications between the annular chamber 80 and that portion of the cylinder forward of the piston. A collapsible sealing cup 86 on the head of the piston controls the port 84, and when the piston is in fully retracted position the rim of the cup uncovers the port 18 to establish communication between that portion of the cylinder forward of the piston and the reservoir. The cup is held against displacement by a spring 88 interposed between the cup and the disk 68 abutting the inverted sealing cup 60. This spring also serves to return the piston to its retracted position and to impose a load on the two-way valve controlling the port 28.

The piston 72 has in its back a recess 90 for the reception of one end of a thrust pin 92, the other end of which is suitably secured to a fitting 94 connected as by a flexible boot 96 to the open end of the cylinder for the exclusion of dust and other foreign substances from the cylinder, and the fitting 94 is connected by a rod 98 to a foot pedal lever 100 pivoted on a suitable support 102 and connected by a retractile spring 104 to a fixed support.

In operation, assuming that the system is filled with suitable fluid and that the piston 72 is in fully retracted position, the two-way valve controlling the discharge port 28 maintains a predetermined pressure on the fluid delivery pipes 32, 34 and 36 and the fluid pressure actuated motors 38, the magnitude of which is dependent upon the tensile strength of the spring 88 acting on the two-way valve.

When it is desired to apply the brakes, the operator depresses the foot pedal lever 100 and this force is transmitted therefrom to the piston 72 to move the piston on its compression stroke. During the initial movement of the piston on its compression stroke, the cup 86 closes the port 18, and upon further movement of the piston on its compression stroke fluid is displaced from the cylinder 14 past the two-way valve whose rim is deflected by the passing fluid, through the fluid pressure delivery pipes 32, 34 and 36, into the fluid pressure actuated motors 38, causing actuation of the motors with the resultant spreading of the shoes 44 and 46 into engagement with the drum 42 against the resistance of the retractile spring 48.

Upon release of the foot pedal lever 100, the retractile spring 104 becomes effective to return this lever to its normal or retracted position, and during this movement of the foot pedal lever the piston 72 is moved to its retracted position under the influence of the spring 88 augmented by the pressure on the fluid returning from the fluid pressure actuated motors 38 under the influence of the retractile spring 84 connected between the shoes 44 and 46 of the respective brake structures. In returning to the master cylinder, the fluid passes through openings 58 in thimble 54, then moves cup 60 and disk 68 to the left so that a space is formed between the base of the cup and the closed end of the thimble, and flows through the space thus produced, and thence through openings 62 and 66 into the cylinder.

Because of the friction on the fluid pressure delivery pipes 32, 34 and 36 and the tensile strength of the spring 88, the piston 72 is returned to its retracted position slightly in advance of the return of fluid from the pressure actuated motors 38 to the cylinder 14. This causes a partial vacuum in the cylinder 14 resulting in suction of fluid from the reservoir 10, through the port 16, the annular chamber 80 and the ports 84 in the head of the piston, past the collapsible cup 86 into that portion of the cylinder forward of the piston to completely fill the cylinder 14. Upon complete return of the piston to its retracted position any excess fluid in the cylinder 14, due to the fluid returned to the cylinder from the fluid pressure actuated motors 38, is discharged from the cylinder through the port 18 into the reservoir.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A fluid pressure producing device including a cylinder, a piston reciprocable therein, a head for the cylinder having an opening providing a discharge port for the cylinder, a sleeve on the head threaded into the cylinder, and a two-way valve comprising a stationary valve element secured to the head within the sleeve, a perforated collapsible sealing cup on the stationary valve element, a member seated on the cup, and a spring interposed between the member and the head of the piston.

2. A fluid pressure producing device including a cylinder, a piston reciprocable therein, a head for the cylinder having an opening providing a discharge port for the cylinder, a sleeve on the head extending into the cylinder, a thimble secured to the head within the sleeve having openings in its wall, a collapsible sealing cup on the thimble having an axial opening, said cup having a rim extending away from said piston, a member seated on the cup, and a spring between the member and the head of the piston.

3. A fluid pressure producing device including a cylinder, a piston reciprocable therein, a head for the cylinder having an opening providing a discharge port for the cylinder, a sleeve on the head extending into the cylinder, a thimble secured to the head within the sleeve having openings in its side wall, a collapsible sealing cup on the thimble having an axial opening, said cup having a rim extending away from said piston, a disk normally seated on the cup having an opening registering with the opening in the cup, a double diametral flange on the disk, the smaller section of the flange fitting the cylinder with substantial clearance and having openings therein, the larger section of the flange fitting snugly in the cylinder, and a spring interposed between the disk and the head of the piston.

4. A fluid pressure producing device including a reservoir, a cylinder supplied therefrom, a piston reciprocable in the cylinder, a collapsible sealing cup on the head of the piston, a head on the cylinder having an opening providing a discharge port for the cylinder, a sleeve on the head threaded into the cylinder, the head having a counter-bore, a thimble open at one end and closed at the other end and provided with a plurality of openings in its wall, the open end of the thimble secured in the counter-bore so as to support the thimble concentrically of the sleeve, a sealing cup on the closed end of the thimble having an axial opening, said cup having a rim extending away from said piston, a disk on the cup having an opening registering with the opening in the cup, a double diametral flange on the disk, the smaller flange fitting the cylinder with substantial clearance and having openings therein, the larger flange slidably engaging the wall of the cylinder, and a spring interposed between the cup on the head of the piston and the disk.

HERBERT C. BOWEN.